United States Patent [19]

Sigg

[11] 3,709,343
[45] Jan. 9, 1973

[54] CLUTCH WITH TEETH ALIGNMENT CAM

[75] Inventor: Hans Sigg, Widen, Switzerland

[73] Assignee: Maag Gear Wheel & Machine Company Limited, Zurich, Switzerland

[22] Filed: Nov. 23, 1971

[21] Appl. No.: 201,293

[30] Foreign Application Priority Data

Nov. 25, 1970 Germany.....................P 20 58 008.9

[52] U.S. Cl..............192/67 R, 192/93 R, 192/108 R
[51] Int. Cl................................................F16d 11/04
[58] Field of Search.......192/67 R, 108 R, 93 R, 48.5

[56] References Cited

UNITED STATES PATENTS 2,821,277 1/1958 Hughes..............................192/67 R
2,981,390 4/1961 Doerper.............................192/67 R
3,348,645 10/1967 Sigg...................................192/67 R

*Primary Examiner*—Benjamin W. Wyche
*Assistant Examiner*—Randall Heald
*Attorney*—Toren and McGeady

[57] ABSTRACT

A gear clutch or coupling has one part with a pair of axially spaced gear rings and another part with a further gear ring engageable alternatively with either of said pair of gear rings. One of the pair of gear rings is relatively narrow and serves simply to align the further gear ring with the other of the pair of gear rings where necessary to allow them to be brought into mesh. For this purpose the teeth of the pair of gear rings are circumferentially offset relative to each other by a distance different from a half tooth pitch.

7 Claims, 8 Drawing Figures

PATENTED JAN 9 1973

3,709,343

3,709,343

CLUTCH WITH TEETH ALIGNMENT CAM

The invention relates to gear clutches or couplings (hereinafter referred to simply as "clutches") in which one part of the clutch carries two toothed gear rings fixed in axially spaced relation and having their teeth relatively offset in the circumferential direction, a further part of the clutch having a toothed gear ring cooperating with the said two toothed gear rings alternatively, said gear ring of the further clutch part being disposed axially between the two mutually offset gear rings when the clutch is disengaged. A prerequisite for such a construction of clutch is that at least one of said clutch parts is rotatable due to the effect of the thrust that can be applied by the other of said parts when the contacting gear teeth are not fully in mesh, due to the effect of chamfering of the teeth.

In a known gear clutch of this construction (German Patent Specification 1,245,654) the two gear rings of said one clutch part are offset relative to each other in the circumferential direction by half a tooth pitch. It is thus possible to engage the clutch by displacement of the second clutch part to one or the other axial direction, even if on one end of the interposed gear ring the tips of the facing teeth of the two clutch parts are disposed opposite to each other. However, it is a disadvantage of the known clutch that its axial structural length is relatively long since each of the two gear rings of said one clutch part must be designed so that it is capable of transmitting the full torque. Moreover, the connection between the slidable clutch part and the associated shaft must be constructed so that it is able to transmit the full torque in both positions of engagement between said two clutch parts. Accordingly, the axial length of the gear ring of the clutch part which is not in use is duplicated, so adding to the overall axial length of the clutch. The increased length increases costs, particularly for clutches of the kind used in high power transmissions, for example marine propulsion transmissions, in which powers of the order of thousands or tens of thousands of horse-power have to be transmitted and in such applications, moreover, the space for such a clutch is usually limited.

It is an object of the invention to construct a clutch of the kind mentioned heretofore but having a shorter structural length for a given load-bearing capacity.

In a clutch according to the invention, the two gear rings in said one clutch part have their teeth mutually offset in the circumferential direction by a fraction of a tooth pitch other than one half of a tooth pitch, the teeth of one of said pair of gear rings having a smaller axial extent than the teeth of said other part gear ring. With such an arrangement, the smaller of the two gear rings need not be constructed to transmit the full torque that can be applied through the clutch but functions only as a registration device that where necessary aligns the gear ring of said other clutch part with the longer gear ring of said one clutch part, that being the ring constructed for transmitting the full torque in said one part.

The invention not only enables the structural length but also the mass of the rotating parts to be reduced, this being a substantial advantage in particular for clutches intended for high power transmissions.

One embodiment of the invention will be explained hereinbelow by reference to the accompanying diagrammatic drawing in which FIG. 1 is an axial view, partly in section, of a clutch according to the invention in the disengaged state;

Figure 3:
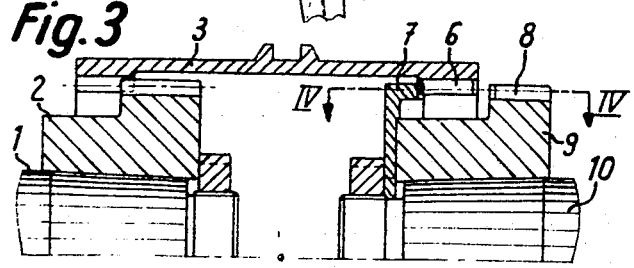
FIG. 3 shows the upper half of the clutch of FIG. 1 at a stage of alignment.
Figure 4:
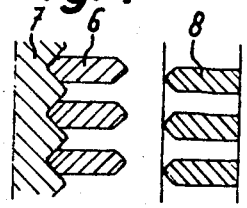
FIG. 4 is a part-circular section along the line IV—IV of FIG. 3.
Figure 5:
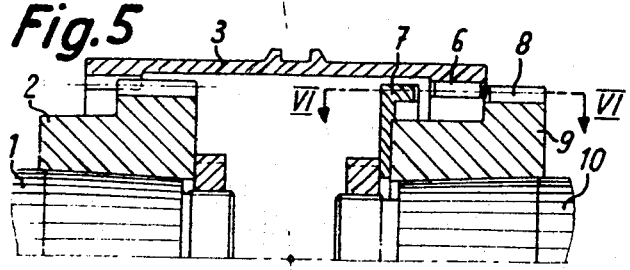
Figure 6:
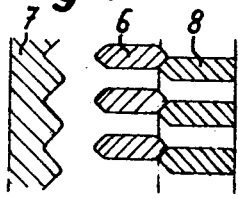
Figure 7:
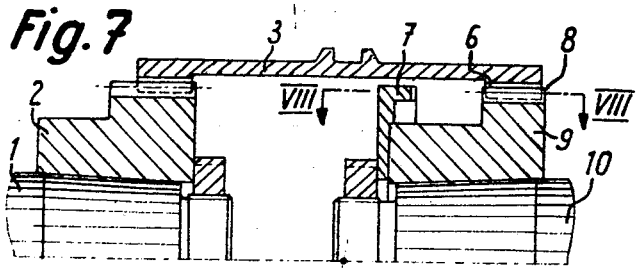
Figure 8:
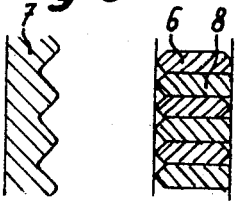

FIGS. 5 and 6 are views similar to those in FIGS. 3 and 4 but showing the beginning of engagement; and FIGS. 7 and 8 are views similar to those in FIGS. 3 and 4 but showing the fully engaged state.

Figure 1:
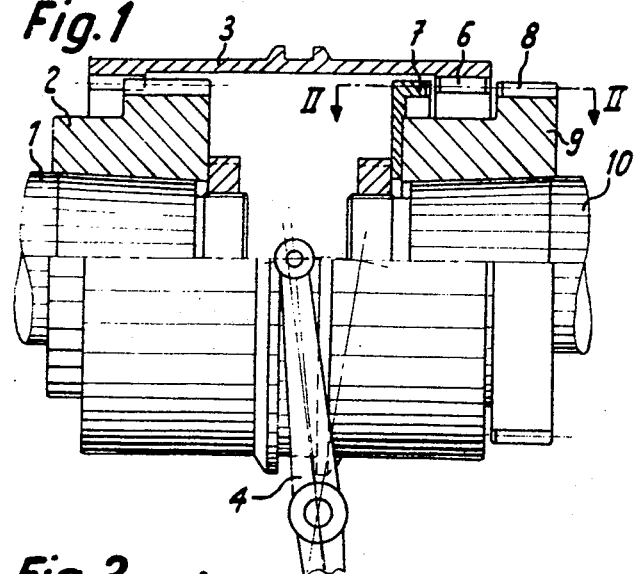

Referring to the drawing, a gear clutch comprises a boss 2 having an external ring of gear teeth and mounted on an input shaft 1 of a transmission unit which is not shown. The external teeth of the boss 2 are permanently in mesh with a ring of internal gear teeth on one end of an axially slidable sleeve 3. For its axial displacement the sleeve 3 is provided with an annular groove with which an operating lever 4 engages. A second internal gear ring 6 of gear teeth is formed on the other end of the sleeve 3, said ring being able to mesh with either of two toothed gear rings 7 and 8 of a boss 9 and being disposed between said two rings when in the disengaged state illustrated in FIGS. 1 and 2. The output boss 9 is mounted on the end of an output shaft 10 that is to be driven by the clutch.

The gear ring 7 is a face gear comprising axially facing teeth projecting from a backing disc or plate, these teeth not being intended for transmitting the full torque but being provided merely as registration or alignment elements. The gear ring 8 comprises conventional outwardly projecting spur teeth having substantially the same axial length as the internal teeth 6 and therefore being capable of transmitting the full torque for which the coupling clutch is designed. As shown in FIGS. 2, 4, 6 and 8, the teeth of the rings 7 and 8 are offset relative to each other by a quarter of a tooth pitch.

Figure 2:
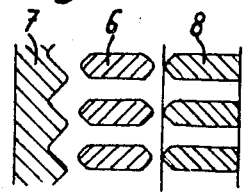
FIG. 2 is a part-circular section along the line II—II of FIG. 1.

When the two shafts 1 and 10 are stationary and the gear rings 6 and 8 are to be engaged with each other, if the tips of the teeth of the two gear rings are disposed opposite to each other, i.e. in the position shown in FIG. 2, engagement by movement of the sleeve 3 to the right will not be possible. In this case however it is possible to engage the teeth 6 with the face gear 7, as shown in FIGS. 3 and 4, by displacement of the sleeve 3 to the left, because the teeth of the gear 7 are offset by a quarter tooth pitch relative to the external teeth of the ring 8. The existence of the offset means that the application of the engaging pressure causes a slight relative rotation between the sleeve 3 and the boss 9 until the teeth of the rings 6 and 7 are completely in mesh. This relative rotation means that the rings 6 and 8 are now in relative positions which permits engagement between them by movement of the sleeve 3 to the right, as shown in FIGS. 5 and 6. If the sleeve 3 is urged further to the right from the axial position illustrated in FIGS. 5 and 6, the pressure applied will cause further relative rotation between the sleeve 3 and the boss 9 until complete engagement is obtained, as shown in FIGS. 7 and 8 when the clutch can transmit its full load.

If the engagement operation begins with the sleeve 3 and the boss 9 in relative positions in which the tooth tips on the left-hand end face of the ring 6 are positioned opposite to the tooth tips of the ring 7, the teeth of the rings 6, 8 will already be offset relative to each other and movement of the sleeve to the right will of course be possible without difficulty to reach the position shown in FIGS. 7 and 8.

If the lever 4 for engaging the clutch is manually actuated it will usually be desirable to attempt first to engage the gear rings 6 and 8 directly by initial displacement of the sleeve 3 to the right. Only if this procedure is not possible, because the right-hand tooth tips of the internally toothed ring 6 are positioned opposite to the tooth tips on the left-hand end face of the gear ring 8, will the sleeve 3 be displaced in the manner already described, first to the left and then to the right after the teeth on the face ring 7 have produced the required relative rotation between the sleeve 3 and the boss 9.

However, if the lever 4 is actuated by an automatic, power-driven engagement apparatus, displacement of the sleeve 3 to the left may preferably be provided initially as a basic operation until, if possible, the tooth tips on the left-hand end face of the ring 6 seat in the tooth gaps of the face ring 7, either directly or after relative rotation between the sleeve 3 and the boss 9. The direction of motion of the lever 4 will then be reversed and the sleeve 3 will be displaced to the right until the rings 6 and 8 are completely engaged.

The circumferential direction in which the teeth of the rings 7 and 8 of the boss 9 are offset relative to each other is immaterial; in relation to a defined direction of rotation it may be said that it is possible for the teeth of the respective rings to be offset relative to each other by three quarters of the tooth pitch as well as by a quarter of the tooth pitch. The offset by a quarter or three quarter pitch represents an optimum but a greater or lesser offset is also possible. Only an offset of half a tooth pitch is excluded.

The offset by a quarter tooth pitch (in either sense) between the rings 7 and 8 is preferred because it is the middle position between the configuration as in FIG. 2 in which the gear rings 6 and 8 are disposed "tip-to-tip" and that in which the rings 6 and 8 engage with each other without any relative rotation at all. This offset also corresponds to the optimum sliding position of the tapered or chamfered portions (FIG. 6) between the teeth of the rings 6 and 8 if engagement is required by movement to the right from the position illustrated in FIG. 4.

If it is assumed that the tips of the teeth of the rings 6, 7 and 8 do not have the angulate form shown in FIGS. 2, 4, 6 and 8, but for reasons of mechanical strength have their ends tapered by rugged radiusing, this would increase the zone over which a "tip-to-tip" situation will occur and it would be more important that the angular adjustment between the parts that is required for full engagement is nevertheless possible in any desired position. This is best ensured if the teeth of the ring 7 are offset relative to the teeth of the ring 8 by one quarter or three quarters of the tooth pitch.

The gear rings 7 and 8 may also be interchanged; that is to say it is alternatively possible for the boss 9 to be provided with external teeth corresponding only to the ring 8 and for the sleeve 3 to be provided with a face gear ring, corresponding to the ring 7, in addition to the internally toothed ring 6 and at an axial distance therefrom slightly greater than the axial length of the toothed ring 8.

It is advantageous for all embodiments if the face gear teeth 7 have a tooth tip angle of approximately 45° and the end faces of the teeth of the rings 6 and 8 which co-operate with each other or with the face gear teeth are also chamfered at an angle of 45°.

What I claim and desire to secure by Letters Patent is :

1. A clutch comprising, in combination, driving and driven parts that are relatively displaceable axially for connection and disconnection of the clutch, a pair of toothed gear rings provided on one of said parts at axially spaced positions, a further gear ring on the other of said parts being disposed between said pair of gear rings when the clutch is disconnected and having teeth engageable with the teeth of either of said pair of gear rings, the teeth of said pair of gear rings being mutually offset on the circumferential direction by a fraction of a tooth pitch other than one half of a tooth pitch, the teeth of one of said pair of gear rings having a smaller axial extent than the teeth of the gear ring of said other part.

2. A clutch according to claim 1 wherein the teeth of said pair of gear rings are offset by one quarter or three quarters of a tooth pitch.

3. A clutch according to claim 1 wherein the smaller of the pair of gear rings is formed as a face gear with axially projecting teeth.

4. A clutch according to claim 1 wherein said further gear ring has axially opposite end regions of its teeth tapered for entry into meshing engagement with said pair of gear rings.

5. A clutch according to claim 4 wherein said ends have 45° tapered faces.

6. A clutch according to claim 4 wherein the teeth of said pair of gear rings have end regions facing said further gear ring that are tapered similarly to the teeth of the further gear ring.

7. A clutch according to claim 4 wherein axially facing ends of the teeth of said pair of gear rings and of said further gear ring have tips that are rounded in circumferential profile.

* * * * *